Sept. 1, 1936.   O. A. KEEP   2,053,150
CIRCUIT BREAKER CONTROL SYSTEM
Filed Nov. 15, 1934
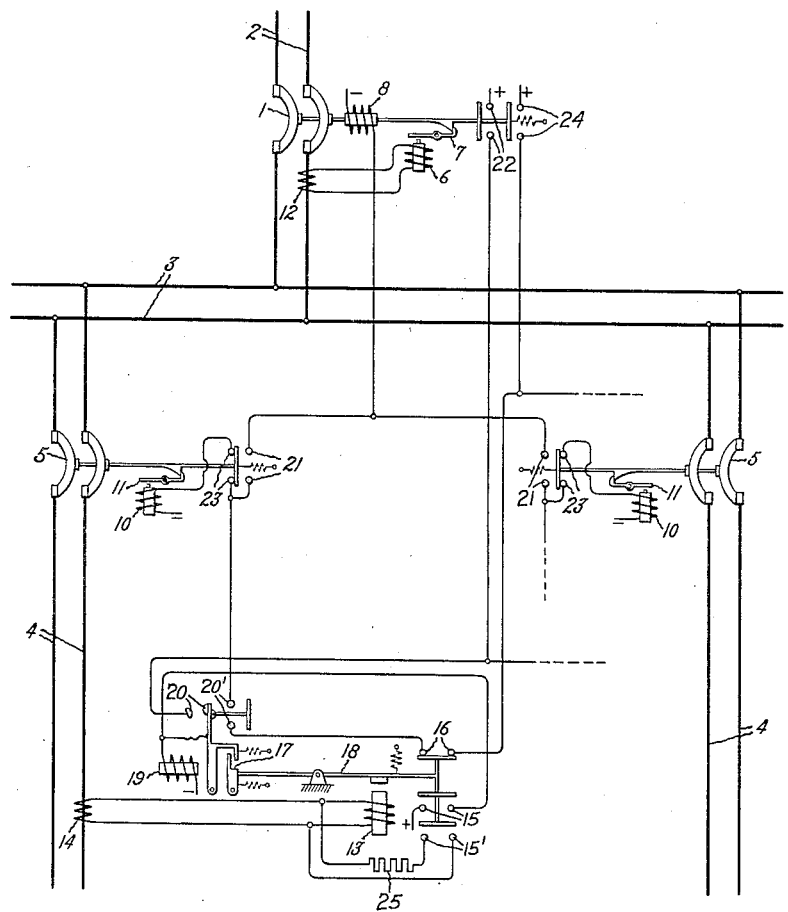
Inventor:
Otto A. Keep,
by Harry E. Dunham
His Attorney.

Patented Sept. 1, 1936

2,053,150

UNITED STATES PATENT OFFICE 2,053,150

CIRCUIT BREAKER CONTROL SYSTEM

Otto A. Keep, Harborcreek, Pa., assignor to General Electric Company, a corporation of New York Application November 15, 1934, Serial No. 753,128

8 Claims. (Cl. 175—294)

My invention relates to circuit breaker control systems and particularly to a system for controlling a plurality of circuit breakers which respectively connect feeder circuits to a common load bus and a group circuit breaker which connects a supply circuit to the load bus. In such control systems suitable control means are provided whereby a fault on any feeder circuit effects first the opening of the group circuit breaker and then the opening of the circuit breaker in the faulty feeder. Such an arrangement has the desirable feature that only the group circuit breaker has to be of sufficient capacity to interrupt the fault current.

One object of my invention is to provide an improved control arrangement for controlling a feeder circuit breaker and the group circuit breaker in a system of the type referred to above.

My invention will be better understood from the following description when taken in connection with the accompanying drawing, which diagrammatically illustrates a circuit breaker control system embodying my invention, and its scope will be pointed out in the appended claims.

Referring to the accompanying drawing, 1 represents a circuit breaker which is arranged to connect a supply circuit 2 to a load bus 3. A plurality of load circuits 4 are respectively arranged to be connected to the load bus 3 by circuit breakers 5. The circuit breakers 1 and 5 may be of any suitable type, examples of which are well known in the art. Preferably the circuit breaker 1 is of the well known high speed type. However, in order to simplify the drawing, I have shown the circuit breaker 1 as a latched-in circuit breaker having a trip coil 6 which when sufficiently energized, releases a latch 7 that holds the circuit breaker in its closed position, and a closing coil 8, which when energized, closes the circuit breaker. The circuit breakers 5 are also shown as latched in circuit breakers and are provided with trip coils 10 which, when sufficiently energized, release the latches 11 that hold the circuit breakers in their closed position. In the particular embodiment of my invention shown in the drawing, it is assumed that the circuit breakers 5 are manually closed, but it will be obvious that any suitable closing means, examples of which are well-known in the art, may be provided for closing the circuit breakers 5. Also in order to simplify the disclosure, only the control apparatus for automatically effecting the opening of one of the circuit breakers 5 is shown in detail since the control apparatus for all the circuit breakers 5 may be the same.

In order to effect the opening of the group circuit breaker 1 in response to a predetermined abnormal condition, such as a fault on any one of the load circuits 4, the trip coil 6 of the circuit breaker 1 is connected by means of a current transformer 12 to the supply circuit 2 so that the trip coil 6 is energized in accordance with the magnitude of the current flowing between the supply circuit 2 and the load bus 3. The trip coil 6 is arranged so that a fault of a predetermined character on any load circuit causes sufficient current to flow through the trip coil 6 to release the latch 7 and allow the circuit breaker 1 to open.

Each load circuit 4 has associated therewith suitable means for effecting the disconnection thereof from the bus 3 in response to predetermined abnormal conditions on the respective load circuit. As shown, each circuit breaker has associated therewith an overcurrent relay 13, the operating coil of which is connected by means of a current transformer 14 to the associated load circuit 4 in such a manner that the operating coil is energized in accordance with the current flowing through the load circuit. Each overcurrent relay is arranged so that it closes its contacts 15 and 15' and opens its contacts 16 when the current in the associated load circuit 4 exceeds a predetermined value. The closing of the contacts 15' connects a resistor 25 in shunt with the operating winding of relay 13 so that the relay will open its contacts 15 and 15' at the desired value of current. Each overcurrent relay 13 is also preferably arranged in any suitable manner, examples of which are well-known in the art, so that the movable armature 18 of the relay remains in its energized position after the operating coil is deenergized. As shown in the drawing, this result is accomplished by means of a latch 17.

Associated with each overcurrent relay 13 is a release magnet 19 which, when energized, releases the latch 17 so that the movable armature 18 is free to move to its normal position when the current through the operating winding of the overcurrent relay 13 decreases below a predetermined value. Each release magnet 19 is provided with contacts 20 and 20', which are closed when the magnet is energized.

In accordance with my invention, the circuit of the trip coil 10 of a circuit breaker 5 can be completed only if the current through the associated load circuit 4 has first exceeded a predetermined value and then decreased below a predetermined value, thus insuring that at the time the circuit breaker opens in response to a fault, the current which it interrupts is below a predetermined value. This result is obtained in the particular embodiment of my invention shown in the drawing by having the overcurrent relay 13 complete through its contacts 15 an energizing circuit for the release magnet 19 and by having the energizing circuit of the trip coil 10 include in series the release magnet contacts 20', which are closed only after the load circuit current has exceeded a predetermined value, and the overcurrent relay contacts 16, which are closed when the feeder circuit current is below a predetermined value. Also in order to prevent the circuit breaker 5 in a faulty feeder from opening until after the group circuit 1 has opened, I include in the holding circuit for the release magnet 19 the auxiliary contacts 22 on the group circuit breaker 1 which are closed when this circuit breaker is open, and also include in the circuit of each trip coil 10 the auiliary contacts 24 on the group circuit breaker 1 which are closed when this circuit breaker is open. Therefore, if a fault on any load circuit 4 does not effect the opening of the group circuit breaker 1, it also does not effect the opening of the associated circuit breaker 5.

In order to reclose the circuit breaker 1 as soon as the circuit breaker 5 in the faulty load circuits opens, each circuit breaker 5 is arranged to complete through its auxiliary contacts 21, when it is open, an energizing circuit for the closing coil 8 of the group circuit breaker 1, if the release magnet contacts 20' and the overcurrent relay contacts 16 associated with the faulty load circuit 4 are simultaneously closed.

The operation of the arrangement shown in the drawing is as follows: When a fault occurs on any one of the load circuits, sufficient current flows through the load circuit to cause the associated overcurrent relay 13 to open its contacts 16 and close its contacts 15 and 15', thereby completing an energizing circuit for the associated release magnet 19 and a circuit through the resistor 25. Also if the fault is severe enough, sufficient current will flow through the circuit breaker 1 to cause the trip coil 6 to release the latch 7 and allow the circuit breaker 1 to open. As soon as the auxiliary contacts 22 on the group circuit breaker 1 closes, a locking circuit is completed for the release magnet 19 through the contacts 20 of the release magnet 19 and the contacts 22 on the circuit breaker 1. Since the opening of the circuit breaker 1 disconnects the supply circuit 2 from the load bus 3, the current supplied to the fault will decrease to such a value that the overcurrent relay 13 in the faulty load circuit 4 will open its contacts 15 and 15' and close its contacts 16. A circuit is then completed for the trip coil 10 of the circuit breaker 5 in the faulty load circuit through the auxiliary contacts 24 on the group circuit breaker 1, contacts 20' of the release magnet 19, contacts 16 of the overcurrent relay 13 and the auxiliary contacts 23 on the circuit breaker 5 in the faulty load circuit. The energization of the trip coil 10 releases the latch 11 so that the faulty load circuit is disconnected from the load bus 3. The circuit breaker 5 by closing its auxiliary contacts 21 completes an energizing circuit for the closing coil 8 of the group circuit breaker 1 so that this circuit breaker recloses and reconnects the supply circuit 2 to the load bus 3. The energizing circuit of the closing coil 8 also includes the auxiliary contacts 24 on the circuit breaker 1, contacts 20' of the release magnet 19 and contacts 16 of the overcurrent relay 13.

If the fault which occurs does not effect the opening of the circuit breaker 1, the subsequent closing of the contacts 16 of the overcurrent relay associated with the faulty load circuit does not effect the opening of the circuit breaker 5 in this load circuit because the energizing circuit is open at the auxiliary contacts 24 on the circuit breaker 1.

While I have, in accordance with the patent statutes, shown and described my invention as applied to a particular system and as embodying various devices, diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a bus, a supply circuit, a circuit breaker connecting said supply circuit to said bus, means responsive to the current flowing between said supply circuit and bus for opening said circuit breaker, a load circuit, a second circuit breaker connecting said load circuit to said bus, means controlled by the current flowing between said bus and load circuit for effecting the opening of said second circuit breaker only after said first mentioned circuit breaker has been opened and the current flowing through said second circuit breaker has first exceeded a predetermined value and subsequently decreased below a predetermined value, and means responsive to the opening of said second circuit breaker for effecting the reclosing of said first mentioned circuit breaker.

2. In combination, a bus, a supply circuit, a circuit breaker connecting said supply circuit to said bus, means responsive to the current flowing between said supply circuit and bus for opening said circuit breaker, a load circuit, a second circuit breaker connecting said load circuit to said bus, and means controlled by said first mentioned circuit breaker and the current flowing between said bus and load circuit for effecting the opening of said second circuit breaker only after said first mentioned circuit breaker has opened and the current flowing through said second circuit breaker has first exceeded a predetermined value and subsequently decreased below a predetermined value.

3. In combination, a bus, a supply circuit, a circuit breaker connecting said supply circuit to said bus, means responsive to the current flowing between said supply circuit and bus for opening said circuit breaker, a load circuit, a second circuit breaker connecting said load circuit to said bus, means controlled by said first mentioned circuit breaker and the current flowing between said bus and load circuit for effecting the opening of said second circuit breaker only after said first mentioned circuit breaker has opened and the current flowing through said second circuit breaker has first exceeded a predetermined value and subsequently decreased below a predetermined value, and means responsive to the opening of said second circuit breaker for effecting the reclosing of said first mentioned circuit breaker.

4. In combination, two electric circuits, a circuit breaker interconnecting said circuits, and means for effecting the opening of said circuit breaker including a trip coil for said circuit breaker, a circuit for said trip coil, two sets of contacts connected in series in said trip coil circuit, means responsive to the current flowing through said circuit breaker for closing one of said sets of contacts when the current flowing through said circuit breaker is above a predetermined value and for closing the other set of contacts when the said current is below a predetermined value, and means for maintaining said one of said sets of contacts closed when the current decreases below said first mentioned predetermined value whereby said trip coil circuit is completed only after the current through said circuit breaker has first exceeded said first mentioned predetermined value and subsequently has decreased below said second mentioned predetermined value.

5. In combination, two electric circuits, a circuit breaker interconnecting said circuits, and means for effecting the opening of said circuit breaker including a trip coil for said circuit breaker, a circuit for said trip coil, an over-current relay connected to one of said circuits and having contacts in said trip coil circuit which are closed when the current through said relay is below a predetermined value, a magnet having contacts in said trip coil circuit which are closed when the magnet is energized, means controlled by said overcurrent relay for completing an energizing circuit for said magnet when the current through said over-current relay exceeds a predetermined value, and a locking circuit for said magnet whereby both of said contacts are closed simultaneously only after the relay current has first increased above said last mentioned value and subsequently has decreased below said first mentioned value.

6. In combination, a bus, a supply circuit, a circuit breaker connecting said supply circuit to said bus, means responsive to the current flowing between said supply circuit and bus for opening said circuit breaker, a load circuit, a second circuit breaker connecting said bus to said load circuit, means for opening said second circuit breaker including a winding which when energized effects the opening of said second circuit breaker, an energizing circuit for said winding, an overcurrent relay responsive to the current through said second circuit breaker and having contacts in said energizing circuit which are closed when the current through said relay is below a predetermined value, a magnet having contacts in said energizing circuit which are closed when said magnet is energized, means controlled by said overcurrent relay for completing an energizing circuit for said magnet when the current through said overcurrent relay exceeds a predetermined value, a locking circuit for said magnet, closing means for said first mentioned circuit breaker, and means responsive to the opening of said second circuit breaker for completing through said contacts of said magnet and the contacts of said overcurrent relay an energizing circuit for said closing means.

7. In combination, a bus, a supply circuit, a circuit breaker connecting said supply circuit to said bus, means responsive to the current flowing between said supply circuit and bus for opening said circuit breaker, a load circuit, a second circuit breaker connecting said bus to said load circuit, means for opening said second circuit breaker including a winding which when energized effects the opening of said second circuit breaker, an energizing circuit for said winding, an overcurrent relay responsive to the current through said second circuit breaker and having contacts in said energizing circuit which are closed when the current through said relay is below a predetermined value, a magnet having contacts in said energizing circuit which are closed when said magnet is energized, means controlled by said overcurrent relay for completing an energizing circuit for said magnet when the current through said overcurrent relay exceeds a predetermined value, a locking circuit for said magnet, and contacts in said locking circuit controlled by said first circuit breaker so that they are closed when said first circuit breaker is open.

8. In combination, a bus, a supply circuit, a circuit breaker connecting said supply circuit to said bus, means responsive to the current flowing between said supply circuit and bus for opening said circuit breaker, a load circuit, a second circuit breaker connecting said bus to said load circuit, means for opening said second circuit breaker including a winding which when energized effects the opening of said second circuit breaker, an energizing circuit for said winding, an overcurrent relay responsive to the current through said second circuit breaker and having contacts in said energizing circuit which are closed when the current through said relay is below a predetermined value, a magnet having contacts in said energizing circuit which are closed when said magnet is energized, means controlled by said overcurrent relay for completing an energizing circuit for said magnet when the current through said overcurrent relay exceeds a predetermined value, a locking circuit for said magnet, contacts in said locking circuit controlled by said first circuit breaker so that they are closed when said first circuit breaker is open, closing means for said first mentioned circuit breaker, and means responsive to the opening of said second circuit breaker for completing through said contact of said magnet and said contacts which are controlled by said first circuit breaker an energizing circuit for said closing.

OTTO A. KEEP.